(12) United States Patent
Cheon et al.

(10) Patent No.: US 8,120,239 B2
(45) Date of Patent: Feb. 21, 2012

(54) INFRARED DISPLAY WITH LUMINESCENT QUANTUM DOTS

(75) Inventors: Kwang-Ohk Cheon, Latham, NY (US); Michael Locascio, Clifton Park, NY (US); San Ming Yang, Troy, NY (US)

(73) Assignee: Samsung Electronics Co., Ltd. (KR)

( * ) Notice: Subject to any disclaimer, the term of this patent is extended or adjusted under 35 U.S.C. 154(b) by 320 days.

(21) Appl. No.: 12/048,061

(22) Filed: Mar. 13, 2008

(65) Prior Publication Data

US 2008/0246388 A1 Oct. 9, 2008

Related U.S. Application Data

(60) Provisional application No. 60/906,560, filed on Mar. 13, 2007, provisional application No. 60/837,847, filed on Aug. 16, 2006.

(51) Int. Cl.
*H01J 1/54* (2006.01)
*H01J 1/62* (2006.01)

(52) U.S. Cl. .................... 313/501; 313/486; 313/487

(58) Field of Classification Search ........... 313/483–512
See application file for complete search history.

(56) References Cited

U.S. PATENT DOCUMENTS

| | | | |
|---|---|---|---|
| 5,615,032 A | 3/1997 | Kalmanash et al. | |
| 6,034,752 A * | 3/2000 | Khan et al. | 349/74 |
| 6,117,529 A * | 9/2000 | Leising et al. | 428/209 |
| 6,211,934 B1 | 4/2001 | Habing et al. | |
| 6,803,719 B1 * | 10/2004 | Miller et al. | 313/501 |
| 6,864,626 B1 * | 3/2005 | Weiss et al. | 313/503 |
| 2004/0262583 A1 * | 12/2004 | Lee | 252/500 |

FOREIGN PATENT DOCUMENTS

JP 2006235621 9/2006

OTHER PUBLICATIONS

PCT International Search Report and Written Opinion dated Aug. 18, 2008.

* cited by examiner

*Primary Examiner* — Joseph L Williams
*Assistant Examiner* — Nathaniel Lee
(74) *Attorney, Agent, or Firm* — Cantor Colburn LLP

(57) ABSTRACT

A display device that includes an underlying excitation source, a converting layer, and an optical filter layer. The underlying excitation source emits light in a spatial pattern that may or may not be altered in time and has a short wavelength capable of being at least partially absorbed by the overlying converting layer. The converting layer can be a contiguous film or pixels of quantum dots that can be dispersed in a matrix material. This converting layer is capable of absorbing at least a portion of the wavelength(s) of the light from the underlying excitation source and emitting light at one or more different wavelengths. The optical filter layer prevents the residual light from the excitation source that was not absorbed by the converting layer from being emitted by the display device.

19 Claims, 5 Drawing Sheets

INFRARED DISPLAY WITH LUMINESCENT QUANTUM DOTS

CROSS-REFERENCE TO RELATED APPLICATIONS

The present application claims priority to U.S. Provisional Application No. 60/906,560, filed on Mar. 13, 2007, which is incorporated by reference herein. The present application also relates to U.S. Provisional Application No. 60/837,847, filed on Aug. 16, 2006, which is also incorporated by reference herein.

TECHNICAL FIELD

The present invention relates to infrared displays comprising luminescent quantum dots.

BACKGROUND

Many technologies for visible full color or monochromatic displays exist or are in development. Example technologies include Cathode Ray Tubes (CRTs), plasma displays, Liquid Crystal Displays (LCDs), Organic Light Emitting Diode (OLED) Displays, Field Emission Displays (FEDs), Surface-conduction Electron-emitter Displays (SEDs), and projection displays. With the exception of projection displays and LCDs that filter white backlight to create red, green, and blue light required for full color display, all other display technology relies on phosphors that emit specific colors (typically red, green, and blue) when energized by an electron beam, ultraviolet light, or electrical current.

In the case of the LCD, the white light is supplied by Cold Cathode Fluorescent Lights (CCFLs) or white LED backlights that employ phosphors excited by UV or blue light respectively. A LCD is a thin, flat display device made up of any number of color or monochrome pixels arrayed in front of a light source. Each pixel consists of a column of liquid crystal molecules suspended between two transparent electrodes, and two polarizing filters, the axes of polarity of which are perpendicular to each other. Without the liquid crystals between them, light passing through one filter would be blocked by the other. The liquid crystal twists the polarization of light entering one filter to allow it to pass through the other. By applying small electrical charges to transparent electrodes over each pixel or subpixel, the molecules are twisted by electrostatic forces and allows varying degrees of light to pass (or not to pass) through the polarizing filters.

In color LCDs each individual pixel is divided into three cells, or subpixels, which are colored red, green, and blue, respectively, by additional filters. A "blue" subpixel absorbs red and green, while a red subpixel absorbs green and blue, and a green subpixel absorbs blue and red light. Each subpixel can be controlled independently to yield thousands or millions of possible colors for each pixel.

A conventional full color backlit LCD backlight has many sources of inefficiency:
1) The white light backlight is either a white LED or a fluorescent light source. The white LED is fabricated of an underlying LED chip, usually a "blue" 460 nm source and occasionally a 405 nm or 390 nm source. The 460 nm, 405 nm are 390 nm sources may emit with the respective wavelength of 460 nm, 405 nm and 390 nm, which normally may be referred to as short wavelength emission. The underlying LED chip is overcoated with a phosphor layer that converts the short wavelength emission emitted by the underlying LED chip to longer wavelength emission. Similarly, the fluorescent light source comprises an ultraviolet lamp coated with white light emitting phosphor. This conversion process is the first source of inefficiency that can degrade potential optical output power by 10-30%. The conversion process may be referred to as down conversion because shorter wavelength emission has higher energy comparing to longer wavelength emission.
2) The backlight is passed through cross polarizers that sandwich the liquid crystal layer. Cross polarizers eliminate ~50% of the light for a pixel that is "on". A pixel that is "off" eliminates all the light and therefore has 0% efficiency
3) The light is then filtered to leave only red, green, or blue per pixel, therefore a further ~66% of the light per pixel is lost.

In total only about 12%-15% of the light generated by the "blue" underlying LED chip makes it though the LCD display and made available to the viewer.

Patent application numbers 20060238671, 20060238103, 20070007881, 20060244367, 20060274226, 20070058107 describe an LCD device where red, green, and blue emitting phosphors and nanocrystals are used in place of the conventional color filter and in conjunction with blue or ultraviolet backlight sources. However, because phosphors and nanocrystals do not have 100% quantum yield and because of the inherent overlap between the absorption and emission spectrum, the maximum amount of light down converted by the phosphors occurs at a phosphor concentration/thickness product where there remains significant bleedthrough from the backlight source. The addition of the residual backlight plus red, green, or blue down converted light may change the perceived color of the pixel and reduce contrast. In at least one patent application, the inventors added a filter to eliminate ambient UV light from exciting the phosphor layer but the filter did not necessarily filter out the residual light from the backlight source.

All the display technologies listed above including LCDs operate in the visible portion of the spectrum. However, there are many applications in the military, police, and fire rescue that require infrared displays which do not emit visible light and can only be observed with night vision goggles or short wavelength infrared and near infrared camera systems. There is also a need to be able to convert a visible emitting display to an entirely infrared emitting display.

Although there are numerous examples and types of visible emitting phosphors used in display technologies, there is a lack of inorganic, small molecule or polymer electroluminescent phosphors that emit efficiently in the infrared spectrum. While there are some examples of infrared photoluminescent cyanine dyes (indocyanine), those molecules are inefficient emitters and are unstable resulting in emission quenching over a period of minutes to hours.

SUMMARY

The present invention provides for an information display device comprising an underlying excitation source; a down converting layer comprising quantum dots disposed over the underlying excitation source; and an optical filter layer disposed over the down converting layer designed to be transparent to the light emitted by the quantum dots of the down converting layer while blocking the residual light originating from the underlying excitation source.

In particular, in an embodiment, the present invention provides an information display device comprising an underlying excitation source that emits a first light having a first wavelength. The first light has a first arrangement varying in time, pattern or both. The information display device further comprises a down converting layer comprising one or more populations of quantum dots disposed over the underlying excitation source. The down converting layer absorbs at least a portion of the first light and reemits a second light having a second wavelength in the infrared portion of the electromagnetic spectrum, the second wavelength being longer than the first wavelength. The second light is reemitted in a second arrangement substantially similar to the first arrangement. The information display device further comprises a long pass optical filter layer disposed over the down converting layer. The long pass optical filter layer absorbs or reflects at least a portion of residual first light that has been transmitted through the down converting layer from the underlying excitation source and that has not been absorbed by the down converting layer.

Of course, the information display device could comprise additional layers and components that do not interfere with the intended function of the device. Also, either or both of the underlying excitation source and the populations of quantum dots can emit more than one wavelength so long as the wavelengths of the underlying excitation source are capable of exciting the respective population of quantum dots. Therefore, the excitation source can have different portions that emit at different wavelengths and the down converting layer can have different populations of quantum dots that emit at different wavelengths so long as the excitation wavelength for any given population of quantum dots is less that the emission wavelength of such population. For example, in a LCD or LED based display, there could be different pixels that have different emission wavelengths that excite different quantum dot populations.

Regarding the individual components of an exemplary information display device, the down converting layer may be in the form of a single, continuous layer containing one or more populations of quantum dots that emit at one or more peak wavelengths when excited by a wavelength originating from the underlying excitation source that is shorter than the emission wavelength of the one or more populations of quantum dots. Alternatively, the down converting layer may be in the form of an array of pixels where at least a portion of the pixels comprise populations of photoluminescent quantum dots. Different pixels may have different quantum dots that emit at different wavelengths.

The down converting layer comprises quantum dots that emit in the visible portion of the spectrum or for some applications may be selected to emit in the infrared (IR) portion of the spectrum. The quantum dots reemit with a peak wavelength characteristic of their average size and composition. Because quantum dots or any other photoluminescent material have some reabsorption due to the inherent overlap of the absorption and emission spectra, the maximum amount of emission down converted occurs at a quantum dot concentration where not all of excitation source emission is absorbed. Thus, there is some inherent bleedthrough of the emission of the excitation source derived from the excitation source through the down converting layer that reduces the contrast and changes the color coordinate of the resultant emission by the information display device. An optical filter layer is disposed over the down converting layer and designed to reflect back or absorb any of the emission derived from the excitation source that has bled through the down converting layer.

Quantum dots have narrow band emission spectrum and a broadband absorption spectrum with a bandedge roughly corresponding to the peak emission wavelength. The quantum dots in the down converting layer may be of a single composition and average diameter emitting at a single wavelength or may be of multiple sizes and compositions emitting at multiple, different wavelengths. Quantum dots generally comprise a core having a diameter less than 50 nm. In preferred embodiments, quantum dots comprise a core having a diameter between 1 and 20 nm. In even more preferred embodiments, quantum dots have a core with a diameter between 1 and 10 nm. The core of the quantum dots may or may not be coated with one or more shells of different semiconductor materials. The quantum dots absorb emissions having a shorter wavelength than the wavelength in which they emit.

In certain embodiments, the down converting layer comprises quantum dots dispersed in a matrix material to form a composite. The matrix material may be, for example, a polymer, silicone, epoxy, sol-gel, ink jettable ink, flexographic ink, screen printing ink, or the like. Non-limiting examples of matrix materials include PMMS, polystyrene, polyethylene, polycarbonate, polyacrylic acid, polyurethane, polyurethane acrylate. The composite may be applied to a substrate to form the down converting layer by a variety of techniques, such as, but not limited to, coating, spin coating, dip coating, printing, ink-jet printing, screen printing, or flexographic printing. Alternatively, the composite may be injection molded or rolled into the desired shape or size.

The underlying excitation source is preferably an OLED or LCD where each pixel in the array is addressed (passively and actively addressed) and emits a short wavelength, wherein the short wavelength may be in the visible, ultraviolet or infrared portion of the electromagnetic spectrum. It is understood that any underlying excitation source that emits in a pattern in the visible, ultraviolet or infrared portion of the spectrum and has sufficient brightness to measurably result in quantum dot light emission can be used. Non-limiting alternative examples include a CRT display, a LED array, a powder electroluminescent devices, a laser beam that can be rastered across a surface, or other sources.

The filter may be referred to as a long pass filter or long pass optical filter layer in the present invention because it allows emission with a long wavelength (e.g., emission emitted by the quantum dots of the down converting layer) to pass through and blocks emission with a short wavelength (e.g., emission originating from the underlying excitation source). The long pass optical filter layer reflects back or absorbs the emission from the underlying excitation source that has bled through the down converting layer. The filter may be, for example, an interference filter or color filter comprising absorbing dyes, pigments, metal ions, or the like, in or coated on a glass or polymer substrate. The filter may further serve as the substrate on which the down converting layer is deposited. Alternatively, in the case of a color filter, the color filter may comprise pixels and pigments or dyes in an ink may be deposited on each individual pixel.

DETAILED DESCRIPTION

Figure 1B:
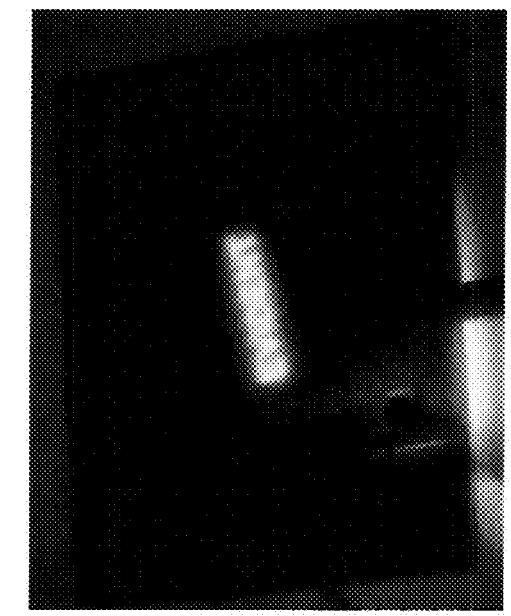
FIG. 1b is a picture of an exemplary display device seen through night vision goggles.
Figure 1A:
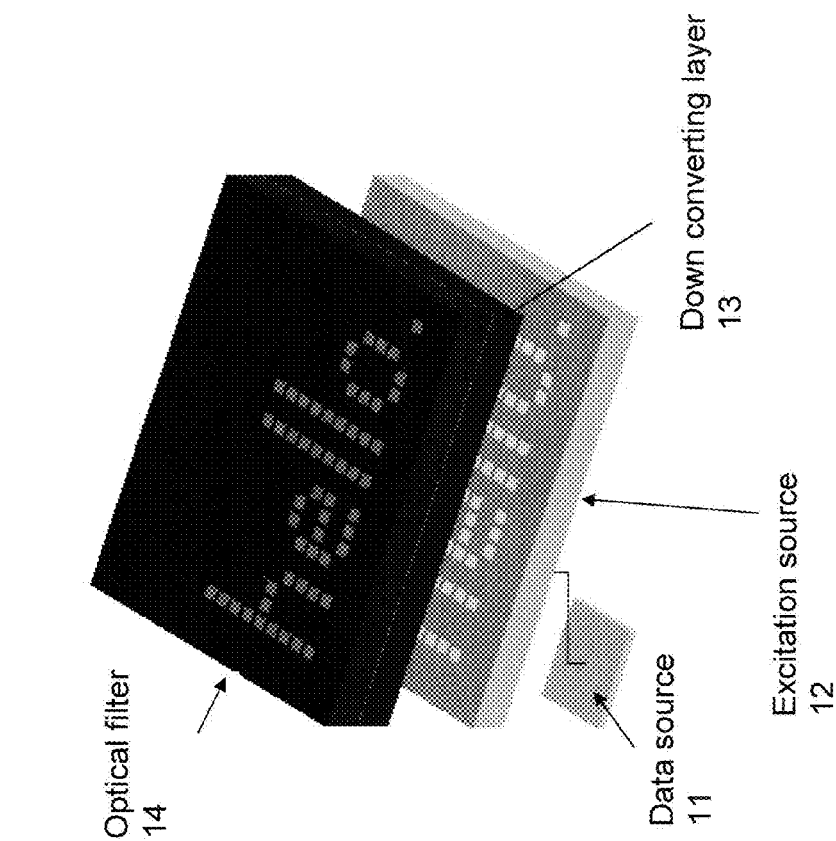
FIG. 1a is an illustration of the information display showing a data source, an underlying excitation source that illuminates a down converting layer comprising quantum dots, and a optical filter layer.

In certain embodiments, the present invention provides information display devices. Referring to FIG. 1a, in an embodiment, an information display device 10 comprises a data source 11, an excitation source 12 disposed over the data source, a down converting layer 13 disposed over the excitation source 12, and an optical long pass filter 14 disposed over the down converting layer 13. By "disposed over" is meant to be in physical contact with the immediately underlying layer or to be in "optical communication" with an underlying layer. By "optical communication" is meant that a layer is capable of receiving the light from the underlying excitation source. Thus, if an above-mentioned layer of an information display device is in optical communication with another above-mentioned layer, there can be other layers disposed therebetween so long as the above-mentioned layers are capable of receiving light from the underlying excitation source.

A data source may provide data information that needs to be displayed. The underlying excitation source may be an OLED array or LCD display where each pixel in the array is addressed (passively and actively addressed) and emits short wavelength emission. The short wavelength light may be referred to as the first light. The short wavelength light may be in the visible, ultraviolet or infrared portion of the electromagnetic spectrum. The short wavelength light may be emitted in an arrangement that varies by pattern and/or time. Examples of an arrangement that varies by pattern includes blinking; or a change in image or text, including a scrolling image or text. Examples of arrangements that vary in time include a change in emission (from red to blue for example). Of course, the arrangement can vary in both pattern and time. Such changes in arrangement allow for a programmable display. A down converting layer can comprise a single film or a plurality of pixels. The single film or the plurality of pixels may comprise one or more populations of visible or infrared emitting quantum dots that absorb a portion of the short first wavelength light emitted by the underlying excitation source and re-emit a longer wavelength light that is in the infrared portion of the electromagnetic spectrum.

Specifically, quantum dots of the down converting layer reemit light with a peak wavelength characteristic of their average size and composition. Because quantum dots or any other photoluminescent material do not have 100% quantum yield and have some reabsorption due to the inherent overlap of the absorption and emission spectra, the maximum amount of light down converted occurs at a quantum dot concentration where not all of light emitted by the underlying excitation source is absorbed. Thus, there is some inherent bleedthrough of light from the addressable light source (e.g., the excitation source) through the down converting layer that reduces the contrast and changes the color coordinate of the resultant light emitted by the device. A long pass optical filter layer is disposed over the down converting layer and is designed to reflect back or absorb any of light from the underlying excitation source that has bled through the down converting layer.

It is understood that the underlying excitation source may be any light source that emits light at a short wavelength capable of being at least partially absorbed by the quantum dots in the down converting layer and that has sufficient brightness to measurably result in quantum dot photoluminescence. Non-limiting alternative display examples include an LED array, a CRT display, powder electroluminescent devices, a laser beam that can be rastered across a surface, and the like.

In one or more exemplary embodiments, the information display device may be intended to be observed by unaided human eye, the first light may be a "blue" light having a wavelength between 440 nm and 480 nm, and the down converting layer may contain red or green emitting nanocrystals where the red and green nanocrystals reside in different pixels. In another exemplary embodiment, violet light having a wavelength between 400 nm and 440 nm, or UV light having a wavelength between 350 nm and 400 nm may be used as the first light in conjunction with a down converting layer having red, green, and blue emitting nanocrystals where the red, green, and blue nanocrystals reside in different pixels.

In other exemplary embodiments, the information display device may be an infrared emitting display observable with night vision goggles, infrared camera, or other observation devices. The first light may be of nearly any wavelength from the UV through the visible spectra. For example, for an infrared emitting display, the excitation source may emit light about 350 m and 700 nm. In a preferred embodiment, the excitation source emits light between about 350 nm and 520 nm. In a more preferred embodiment, the excitation source emits light between about 350 nm and 480 nm.

The quantum dots comprising the down converting layer may be of a single composition and average diameter emitting at a single wavelength or may be of multiple sizes and compositions emitting at multiple, different wavelengths. Quantum dots generally comprise a core have a diameter less than 50 nm, In certain embodiments, the diameter is between 1 and 20 nm, and in even more preferred embodiments the diameter is between 1 and 10 nm. The core of the quantum dots may or may not be coated with one or more shells of different semiconductor materials. Nonlimiting examples of quantum dot compositions that emit light in the visible portion of the spectrum include CdSe, CdS, CdTe, InGaP, ZnSe, ZnTe, GaN, InGaN, AlN, AlInGaP, AlP, GaAs, GaSb, CuInGaS$_2$. Said quantum dots may have an optional shell or shells comprising a wide bandgap semiconductor such as ZnS. Nonlimiting examples of quantum dot compositions that photoluminesce in the infrared spectrum of wavelengths include Lead Sulfide, Lead Selenide, Copper Indium Gallium Diselenide, Copper Indium Disulphide, Lead Telluride, Indium Arsenide, Indium Antimonide, Mercury Selenide, Bismuth Selenide etc. and combinations thereof. Infrared wavelengths emitted by quantum dots that photoluminesce in the infrared spectrum include but are not limited to 750-1000 nm. In preferred embodiments, the quantum dots emit at 800-950 nm wavelengths (where night vision goggles and silicon based detector arrays used in IR cameras are most sensitive). In other embodiments, the quantum dots emit at 1450-1650 nm, 1700-2100 nm, 3000-5000 nm, and/or 8000-12000 nm wavelengths. All such wavelength ranges include all intermediate values in between. Shells surrounding quantum dot cores generally but not exclusively comprise semiconductor materials that have a wider bandgap than that of the core. Non-limiting examples of semiconductor materials used as shells surrounding a core include ZnS, ZnSe, and CdS.

An advantage in using quantum dots for infrared emission compared to traditional IR dyes, pigments, or phosphors is that many of these traditional materials convert red or NIR light to infrared light, whereas quantum dots can convert light of nearly any shorter wavelength than their emission wavelength, facilitating the use of any conventional display to be used as an IR display, since ultraviolet and blue light can be converted into an IR signal. Many displays include CRTs, plasma displays, LCDs, OLED Displays, FEDs, SEDs, and projection displays. These displays rely on an underlying UV or blue light source, which with the down converting layer of the present invention would make an IR emitting display. An added advantage especially using an OLED is that the thin film of down converting layer can be flexible, and could thus be incorporated with a flexible OLED and used in many unconventional applications. Another advantage is that these displays can be programmable, allowing messages, logos, or other similar information to be displayed but observable only to an infrared detection system, and OLEDs allow for much higher clarity for a more complex message. The only other way to currently achieve this is using IR LEDs, which do not allow for the thin, flexible display which can even be portable by using an OLED with a thin film down-converting layer disposed over it.

A down converting layer may comprise quantum dots dispersed in a matrix material to form a composite. The matrix material may be a polymer, silicone, epoxy, sol-gel, ink jettable ink, flexographic ink, screen printing ink, or any combination thereof. Non-limiting examples include PMMS, polystyrene, polyethylene, polycarbonate, polyacrylic acid, polyurethane, polyurethane acrylate, or any combination thereof including any co-polymer thereof. The composite may be applied to a substrate via coating, spin coating, dip coating, printing, ink-jet printing, screen printing, or flexographic printing. Alternatively, the composite may be injection molded or rolled into the desired shape or size.

A long pass optical filter layer that is part of an information display device reflects back or absorbs light that has bled through the down converting layer. The filter may be, for example, an interference filter or color filter comprising absorbing dyes, pigments, metal ions, or the like in or coated on a glass or polymer substrate. The filter may further serve as the substrate on which the down converting layer is deposited. Alternatively, in the case of a color filter, the color filter may comprise pixels and pigments or dyes in an ink may be deposited on each individual pixel. The optical filter layer is positioned such that the first light interacts with the down converting layer and only a residual portion of the first light that is not absorbed by the down converting layer interacts with the optical filter layer. The optical filter layer is also substantially transparent to the second light with infrared wavelengths and thus only blocks the residual first light.

The quantum dots may be referred to as tunable quantum dots because the size of the core may be tuned to a desired value. Also, the core may be coated with one or more semiconductor shells. Material for the quantum dots and shells may be chosen from a wide variety semiconductor materials described above. By using tunable quantum dots in combination with a long pass filter, a more narrow band of infrared signal may be produced, and thus, a controlled detection may be achieved. For example, the quantum dots may be tuned to emit infrared of 950 nm, the long pass filter may be chosen to allow passage of wavelength of 900 nm or more. A detection system (e.g., a night vision goggle) may employ a complimentary low pass filter that may allow passage of wavelength of 1000 nm or less. Thus, only signals with wavelengths between 900 nm to 1000 nm may be detected.

In one embodiment of the present invention a Red/Green/Blue (RGB) display comprises an underlying excitation source emitting blue light used as the first light source, a down converting layer where ⅓ of the pixels of the down converting layer emit green, ⅓ emit red, and the remaining ⅓ of the pixels have no down converters. The optical filter layer designed to reflect or absorb the blue light is applied only to the red and green pixels of the underlying excitation source while no filter is applied to the pixels having no down converters thus allowing the blue light to be emitted.

In another exemplary embodiment, an information display device may comprise an underlying excitation source that emits a first light having a blue wavelength. The first light may be emitted in an arrangement that varies in time, pattern or both. The information display device may further comprise a down converting layer disposed over the underlying excitation source. The down converting layer may comprise approximately a first one-third (⅓) of pixels that have a population of a first infrared wavelength emitting quantum dots that absorb at least a portion of the first light, approximately a second one-third (⅓) of pixels have a second infrared wavelength emitting quantum dots that absorb at least a portion of the first light, and approximately a third one-third (⅓) of pixels have no quantum dots that are transparent to the first light. The information display device may further comprise a long pass optical filter layer deposited over the first and second infrared wavelength emitting pixels that absorbs or reflects at least a portion of residual first light that has been transmitted through the down converting layer.

An exemplary, but non-limiting, information display device resembles a Liquid Crystal Display. However, the color filters present in a traditional LCD are replaced by a down converting layer comprising an array of luminescent pixels. Further, the conventional white light backlight is exchanged for a short wavelength source such as a violet or UV emitting LED, or ultraviolet lamp that is capable of exciting the semiconductor nanocrystal complexes. The pixel dimensions can range from 10 microns to 1000 microns depending upon the desired resolution of the array and can be arranged in any pixel geometry that is commonly used is displays. When illuminated by an appropriate short wavelength backlight, the pixels in the array will emit light at the wavelength associated with the quantum dots within the pixel. In one exemplary embodiment, if a 440 nm-470 nm "blue" LED is used as a backlight, the pixels containing "blue" emitting quantum dots may be eliminated and replaced by a blank pixel that contains no quantum dots at all. In a RGB display, using a blue LED, a blank pixel allows the underlying blue source to act as the blue pixel without the necessity of using "blue" quantum dots.

The down converting process in a quantum dot results in an efficiency loss of ~30%, similar to that of a 'white' phosphor used directly on top of a blue LED. This is still much less of an energy loss than those associated with existing color filters presently used in LCDs (~66%). Additionally, when a "blue" LED backlight is used in conjunction with the present invention, the "blue" pixels, that have no quantum dots, would show 0% efficiency loss. In light of this, the efficiency of LCD can be significantly further increased, by over 300%, by the replacement of traditional absorptive color filters used in present color LCDs by a luminescent quantum dot array. In addition to increasing the efficiency of the underlying device, the quantum dot array would result in the reduction of the power consumption of the LCD display thereby extending the battery life of mobile electronics devices.

Figure 4:
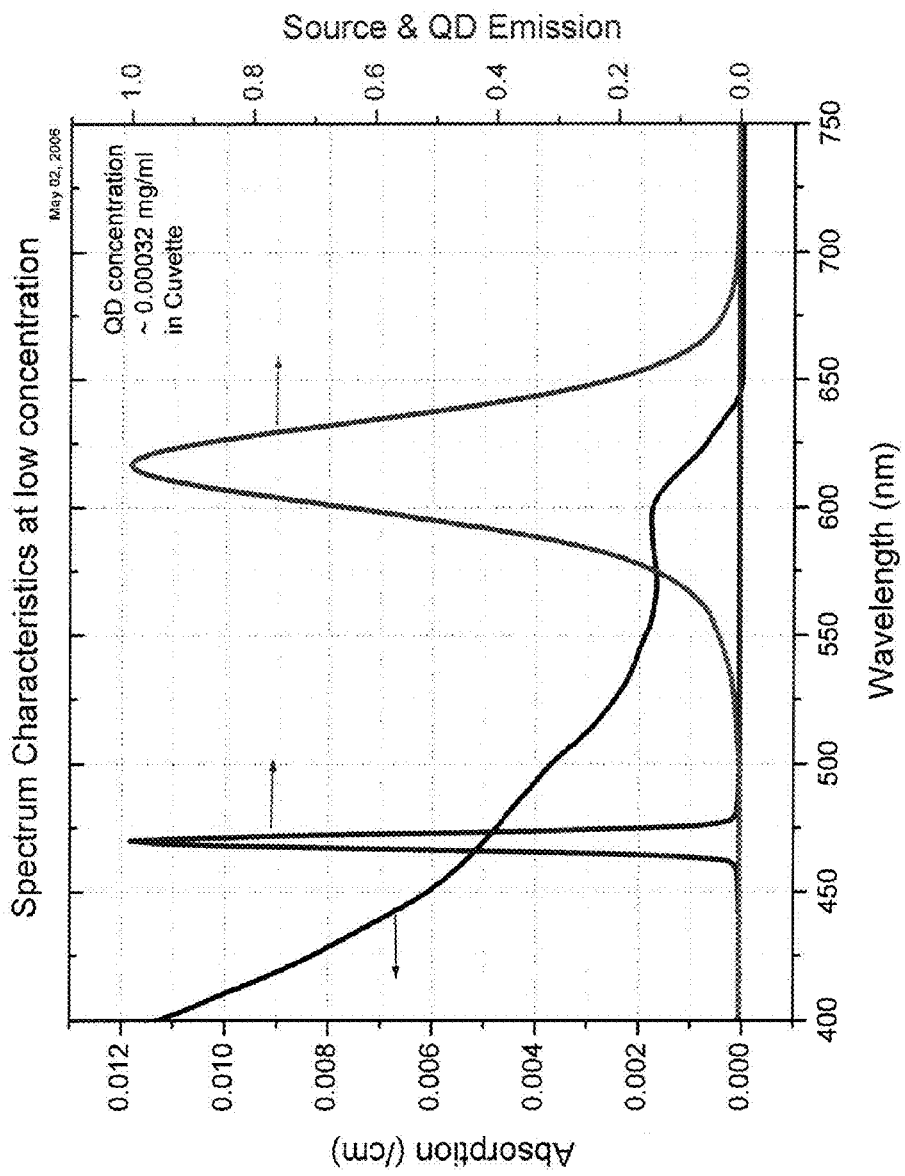
FIG. 4 shows an exemplary excitation source spectrum $S_1(\lambda)$, quantum dot emission spectrum $Q_1(\lambda)$, and absorption $\alpha(\lambda)$ spectrum.
Figure 5A:
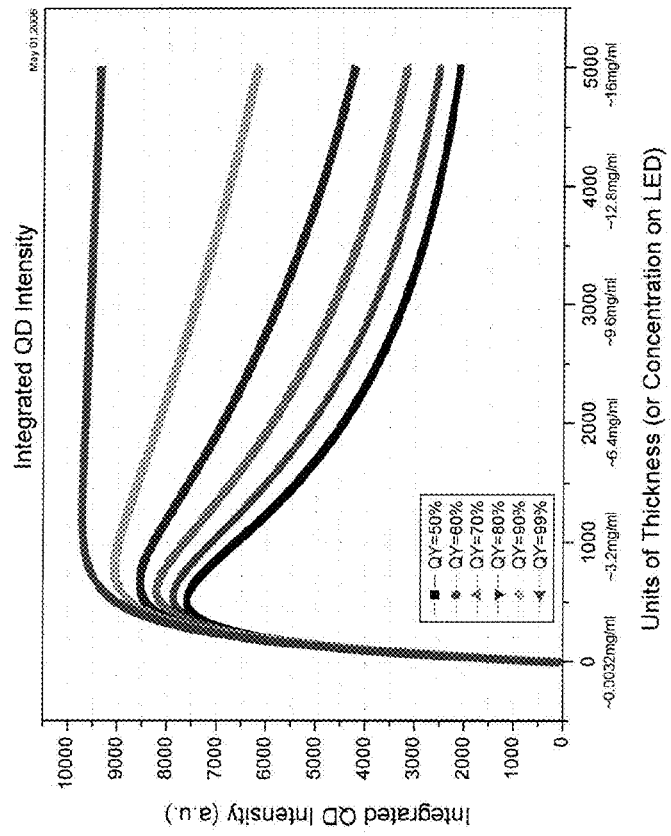
FIG. 5a is data of the quantum dot emission spectrum at various concentrations at a given thickness. At higher concentrations the emission of the nanocrystals is reduced due to reabsorption.
Figure 5B:
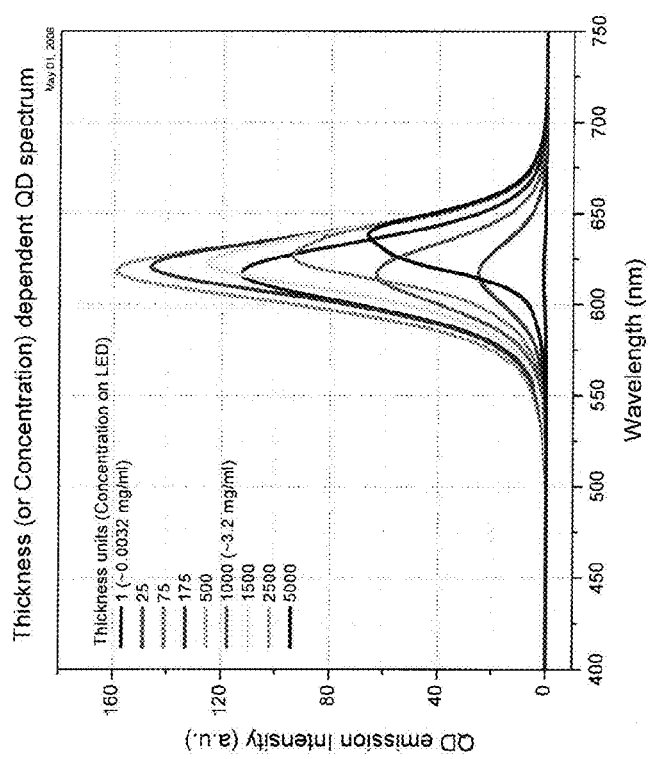
FIG. 5b is a calculation showing the amount of light down converted by a layer of quantum dots excited by a short wavelength source as a function of concentration and/or thickness for various quantum yields.

In another embodiment of the invention a RGB display comprises: a violet or ultraviolet light used as the excitation source; a down converting layer, where ⅓ of the pixels of the down converting layer emit green, ⅓ emit red, and the remaining ⅓ of the pixels emit blue; and an optical filter layer that is designed to absorb or reflect the residual ultraviolet or violet that is not absorbed by the down converting layer. See FIG. 4.

In yet another embodiment of the invention, an infrared display meant to be observed by the human eye augmented with night vision goggles or infrared imaging equipment comprises an ultraviolet, visible, or infrared excitation source, a down converting layer comprising infrared emitting quantum dots in a thin layer or in pixels and an overlying optical filter layer. (See FIG. 1b). The excitation source emits a first light having a wavelength shorter than the wavelength of light emitted by the quantum dots in the down converting layer. The overlying optical filter layer is used to absorb or reflect back any of the residual first light that is not absorbed by the down converting layer. In this embodiment, the down converting layer is applied to the upper surface of the excitation source or to the lower surface of the optical filter layer, or is a stand alone film or plate that is affixed to the underlying excitation source. The down converting layer absorbs a portion of the shorter wavelength light emitted by the underlying excitation source in a pattern (potentially time varying pattern) and reemit light in substantially the same pattern (or time varying pattern) at a second wavelength or multiple secondary wavelengths in the appropriate infrared portion of the spectrum.

In one method of making a down converting layer, the quantum dots are self assembled onto an excitation source or a substrate by controlled precipitation of the quantum dots onto the excitation source or the substrate through methods known in the art. Alternatively, quantum dots may be dispersed within a solution of liquid phase sol-gel, epoxy, silicone, or dissolved polymer and applied and cured or dried onto the display or substrate through spin and dip coating, draw bars and doctor blades or other methods of making thin films from a liquid precursor which are well known in the art. In another method of making a down converting layer, the quantum dots are dispersed into flexographic, screen, ink jet or other inks and printed or rolled onto the display or substrate. Methods of making quantum dot inks are disclosed in provisional patent application No. 60/802,446 (Inks Colorants Comprising Semiconductor Nanocrystal Complexes (May 23, 2006), which is incorporated by reference herein.

In yet another method of making a down converting layer, the quantum dots are dispersed within a substantially transparent plate by solvating the quantum dots into polymer, silicone, sol-gel, or epoxy in a dissolved, molten or uncured state and casting or molding the nanocrystal/matrix dispersion onto a plate followed by a cooling, drying, or curing step that solidifies the dispersion. It is accepted that for all methods of making a down converting layer save the self assembly method, quantum dots may first be incorporated into microparticles comprising polymer, silica, or other substantially transparent polymeric or inorganic material that is further dispersed into an ink, or liquid phase sol-gel, epoxy, silicone, or polymer. In all cases the thickness and density of quantum dots in a down converting layer is designed to maximize the output of down converted light. The maximum output of the down converted light occurs at a concentration thickness product where a portion of the first light from the excitation source is transmitted through the down converting layer.

Typical concentrations of quantum dots within the quantum dot layer vary from 0.1% to 20% by weight but increased concentrations are possible. Self assembled films may be made entirely of quantum dots. Quantum dots may be in a layer with a thickness of 10 nm to 1 cm.

In certain embodiments, a method of manufacturing an information display device includes applying the down converting layer to a substrate. The down converting layer can be deposited into pixels where each pixel has a different population of quantum dots emitting at a different wavelength.

Described below is a non-limiting specific example of an embodiment of the present invention.

EXAMPLE

Monochromatic OLED displays were obtained from OSRAM Opto Semiconductors that emit in the visible portion of the spectrum at the following color coordinates;

1.1" diagonal; 128×48 pixels; outside dimensions 34.7× 32.2×1.7 mm; "Ocean Blue" color coordinates x=0.14, y=0.17

2.7" diagonal; 128×64 pixels; outside dimensions 89.7× 46.7×3.4; "Spring Green" color coordinates x=0.41, y=0.58

1.2" diagonal; 96×64 pixels; outside dimensions 34.8× 31.1×3.8; "Lime Green" color coordinates x=0.37, y=0.62

Figure 2A:
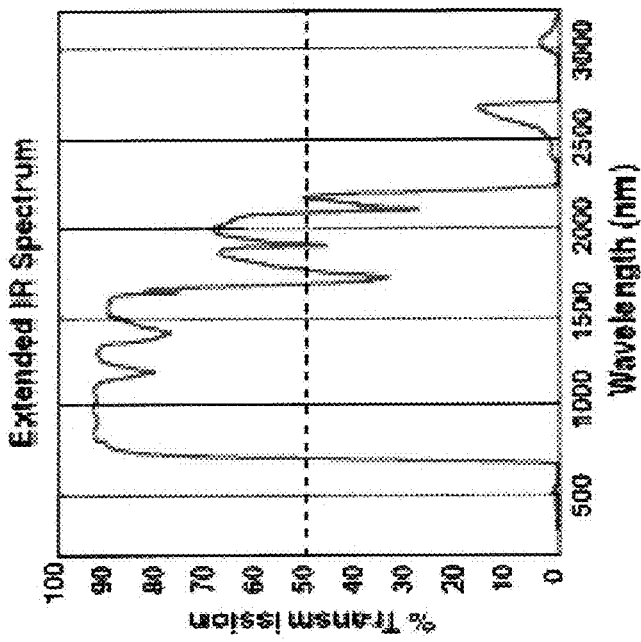
FIG. 2a is a graph of the optical transmission spectra of optical filter layers used to absorb residual short wavelength light that originates in the visible display but did not get absorbed and converted into IR radiation by the down converting layer.
Figure 2B:
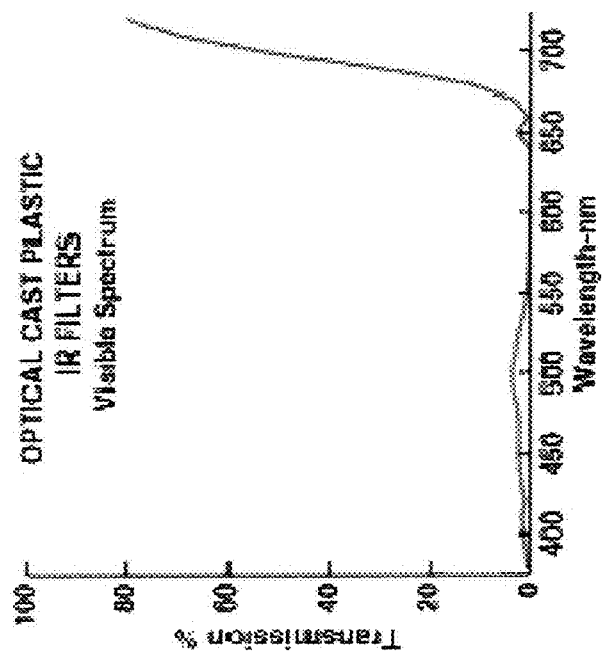
FIG. 2b is a graph showing the optical transmission spectra of optical filter layers extended out to longer wavelengths.
Figure 3:
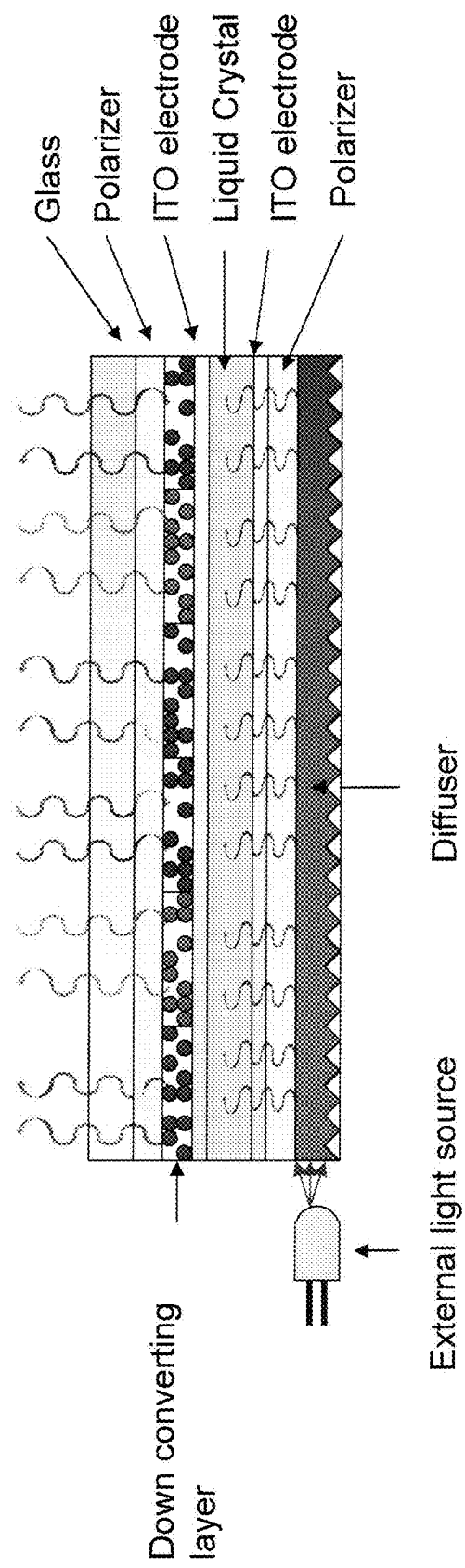
FIG. 3 is an illustration of an LCD where the traditional color filter is replaced by a down converting layer, where the down converting layer is an array of pixels. Each pixel emits red, green, or blue light depending upon the nanocrystal populations that they contain.

Optical Cast IR Longpass Filters were obtained from Edmund Optical. The filters comprise a dye dispersed within a polymeric plate that absorb visible light but are transparent to infrared radiation. The optical transmission exhibited by the filters is shown in FIG. 2a and FIG. 2b.

Several down converting layer configurations were fabricated. In the first instance, lead sulfide quantum dots that emit light with a peak wavelength of 850 nm were incorporated into a flexographic ink at various concentrations. The flexographic ink was applied to a transparent polyethylene film substrate via standard printing methods and affixed to the surface of the OLED display. In the second instance, lead sulfide quantum dots emitting at 850 nm were dispersed within a UV curable polyurethane acrylate, uniformly coated onto a glass substrate and cured by exposure to UV light. In the third instance, the lead sulfide quantum dots emitting at 850 nm were cosolvated with PMMA. A solid plate comprising quantum dots in PMMA was produced by pouring the solution into a mold and driving off of the solvent via gentle heating.

The down converting layers in all three instances were then affixed to the surface of the OLED display. The optical filter layers were subsequently affixed to the quantum dot layer. An example of the resulting displays can be seen in FIG. 1b.

The foregoing description and example have been set forth merely to illustrate the invention and are not intended as being limiting. Each of the disclosed aspects and embodiments of the present invention may be considered individually or in combination with other aspects, embodiments, and variations of the invention. In addition, unless otherwise specified, none of the steps of the methods of the present invention are confined to any particular order of performance. Modifications of the disclosed embodiments incorporating the spirit and substance of the invention may occur to persons skilled in the art and such modifications are within the scope of the present invention. Furthermore, all references cited herein are incorporated by reference in their entirety.

We claim:

1. An information display device comprising:

an underlying excitation source that emits a first light having a first wavelength, the first light having a first arrangement varying in time, pattern or both;
a down converting layer disposed over the underlying excitation source and comprising:
approximately a first one-third (⅓) of pixels have a population of a first infrared wavelength emitting quantum dots that absorb at least a portion of the first light;
approximately a second one-third (⅓) of pixels have a second infrared wavelength emitting quantum dots that absorb at least a portion of the first light; and
approximately a third one-third (⅓) of pixels have no quantum dots that are transparent to the first light; and
a long pass optical filter layer disposed over the first and second infrared wavelength emitting pixels that absorbs or reflects at least a portion of residual first light that has been transmitted through the down converting layer.

2. The information display device of claim 1, wherein the second light emits at wavelengths in addition to the second wavelength.

3. The information display device of claim 1, wherein the underlying excitation source is a OLED, LED array, cathode ray tube, liquid crystal display, field emission display, plasma display, surface emission display, laser display, or any suitable combination thereof.

4. The information display device of claim 1, wherein the first wavelength is the blue (440-480 nm), violet (400-440 nm), or ultraviolet (350-400 nm) portion of the electromagnetic spectrum.

5. The information display device of claim 1, wherein the one or more populations of quantum dots are dispersed in a matrix material that is substantially transparent to both the first light and the second light.

6. The information display device of claim 5, wherein the matrix material is a plastic, silicone, epoxy, sol-gel, ink jettable ink, flexographic ink, screen ink, paint or any suitable combination thereof.

7. The information display device of claim 5, wherein the matrix material is a self supporting plate, sheet, or film.

8. A method of manufacturing the information display device of claim 4, the method comprising applying the down converting layer to a substrate.

9. The method of claim 8, wherein the method comprises depositing the down converting layer into pixels where each pixel has a different population of quantum dots emitting at a different wavelength.

10. The method of claim 8, wherein the substrate is a plate, sheet, film of plastic, silicone, glass, or any suitable combination thereof.

11. The method of claim 8, wherein the substrate also serves as the optical filter layer, the substrate being positioned such that the first light interacts with the down converting layer and only a residual portion of the first light that is not absorbed by the down converting layer interacts with said substrate.

12. The information display device of claim 1, wherein each of the quantum dots comprises a core of a first semiconductor material, the core having a diameter between 1 nm and 20 nm.

13. The information display device of claim 12, wherein the first semiconductor material comprises one of PbS, PbSe, PbTe, $CuInGaS_2$, $CuInGaSe_2$, InP, InGaP, InSb, InAs, GaAs, HgTe, HgSe, HgS, and CdHgTe.

14. The information display device of claim 1, wherein the optical filter layer is an interference filter that reflects the first light and is transparent to the second light.

15. The information display device of claim 14, wherein the optical filter layer comprises dye dispersed in a matrix material where said dye absorbs the first light and is transparent to the second light.

16. The information display device of claim 1, wherein the first-semiconductor material comprises one of PbS, PbSe, PbTe, $CuInGaS_2$, $CuInGaSe_2$, InP, InGaP, InSb, InAs, GaAs, HgTe, HgSe, HgS, InGaN, AlInGaP, BiSe, $CuInS_2$ and CdHgTe.

17. An information display device comprising:
an underlying excitation source that emits a first light having a blue wavelength, the first light having a first arrangement varying in time, pattern or both;
a down converting layer disposed over the underlying excitation source and comprising:
approximately a first one-third (⅓) of pixels have a population of a first infrared wavelength emitting quantum dots that absorb at least a portion of the first light;
approximately a second one-third (⅓) of pixels have a second infrared wavelength emitting quantum dots that absorb at least a portion of the first light; and
approximately a third one-third (⅓) of pixels have no quantum dots that are transparent to the first light; and
a long pass optical filter layer deposited over the first and second infrared wavelength emitting pixels that absorbs or reflects at least a portion of residual first light that has been transmitted through the down converting layer, wherein each of the first and second infrared wavelength emitting quantum dots comprise a core of a material chosen from the group consisting of $CuInGaS_2$, $CuInGaSe_2$, InGaP, InGaN, AlInGaP, BiSe, $CuInS_2$ and CdHgTe.

18. The information display device of claim 1, wherein each of the quantum dots further comprises a shell of an additional material chosen from the group consisting of: ZnS, ZnSe, and CdS.

19. The information display device of claim 17, wherein each of the first and second infrared wavelength emitting quantum dots comprises a shell of an additional material chosen from the group consisting of: ZnS, ZnSc, and CdS.

* * * * *